US008967680B2

(12) United States Patent
Yokomori et al.

(10) Patent No.: US 8,967,680 B2
(45) Date of Patent: Mar. 3, 2015

(54) VEHICLE DOOR CLOSER DEVICE

(71) Applicant: Mitsui Kinzoku Act Corporation, Kanagawa (JP)

(72) Inventors: Kazuhito Yokomori, Kanagawa (JP); Kohei Yamashita, Kanagawa (JP)

(73) Assignee: Mitsui Kinzoku Act Corporation (JP)

( * ) Notice: Subject to any disclaimer, the term of this patent is extended or adjusted under 35 U.S.C. 154(b) by 0 days.

(21) Appl. No.: 13/924,664

(22) Filed: Jun. 24, 2013

(65) Prior Publication Data
US 2014/0000169 A1 Jan. 2, 2014

(30) Foreign Application Priority Data

Jun. 28, 2012 (JP) ................................. 2012-145838
Jun. 28, 2012 (JP) ................................. 2012-145839

(51) Int. Cl.
*E05F 15/10* (2006.01)
*B60J 5/00* (2006.01)

(52) U.S. Cl.
CPC . *E05F 15/10* (2013.01); *B60J 5/00* (2013.01); *E05Y 2201/72* (2013.01); *E05Y 2400/30* (2013.01); *E05Y 2900/531* (2013.01)
USPC ....................................................... 292/201

(58) Field of Classification Search
CPC ........ E05B 81/20; E05B 83/40; E05B 53/008
USPC ................... 49/279, 280, 394, 324, 339, 340; 292/201, 216, DIG. 23, 279, 280
See application file for complete search history.

(56) References Cited

U.S. PATENT DOCUMENTS

| 5,443,292 | A | * | 8/1995 | Shimada et al. | ......... 292/341.16 |
| 5,551,190 | A | * | 9/1996 | Yamagishi et al. | ............. 49/360 |
| 5,564,761 | A | * | 10/1996 | Mizuki et al. | ................. 292/201 |
| 5,829,198 | A | * | 11/1998 | Watanabe | ........................ 49/280 |
| 6,137,249 | A | * | 10/2000 | Butler et al. | .................. 318/266 |
| 6,223,468 | B1 | * | 5/2001 | Kobayashi | ...................... 49/280 |
| 6,390,516 | B1 | * | 5/2002 | Kobayashi | .................... 292/201 |
| 6,422,615 | B1 | * | 7/2002 | Roos et al. | ..................... 292/216 |
| 6,499,776 | B2 | * | 12/2002 | Takamura | ..................... 292/201 |
| 6,550,825 | B2 | * | 4/2003 | Ostrowski et al. | ............ 292/199 |
| 6,676,556 | B2 | * | 1/2004 | Ishihara et al. | ............... 475/269 |
| 6,685,239 | B2 | * | 2/2004 | Yamauchi et al. | ............ 292/201 |
| 6,701,671 | B1 | * | 3/2004 | Fukumoto et al. | .............. 49/280 |

(Continued)

FOREIGN PATENT DOCUMENTS

JP  2004-293038  10/2004
JP  2007-138530  6/2007

*Primary Examiner* — Katherine Mitchell
*Assistant Examiner* — Justin Rephann
(74) *Attorney, Agent, or Firm* — Skinner and Associate; Joel Skinner

(57) ABSTRACT

In a planetary gear mechanism of a vehicle door closer device, a planetary gear meshes with a sun gear and a ring gear. When the ring gear turns in one direction, the planetary gear orbits while it turns on its own axis. A closing lever is pivoted on the planetary gear and turns with orbiting of the planetary gear to move the latch to a full-latch position to enable the door to close. When the ring gear turns in the other direction, the planetary gear turns on its own axis and the sun gear turns to allow the ratchet to release from the latch to to enable the door to open.

The planetary gear mechanism slows down a motor and a motion is transmitted to the ratchet to enable the ratchet to release from the latch. When the motor stops, the motion is disconnected to enable the ratchet to return to engagement with the latch.

10 Claims, 15 Drawing Sheets

(56) References Cited

U.S. PATENT DOCUMENTS

| | | | |
|---|---|---|---|
| 6,974,165 B2* | 12/2005 | Koike et al. | 292/216 |
| 7,032,937 B2* | 4/2006 | Boecker et al. | 292/201 |
| 7,360,337 B2* | 4/2008 | Yoneyama | 49/281 |
| 7,434,853 B2* | 10/2008 | Yamamoto et al. | 292/216 |
| 7,445,258 B2* | 11/2008 | Rice et al. | 292/341.16 |
| 7,537,249 B2* | 5/2009 | Ichinose et al. | 292/216 |
| 7,581,767 B2* | 9/2009 | Fujihara | 292/201 |
| 7,614,670 B2* | 11/2009 | Hayakawa et al. | 292/216 |
| 8,613,160 B2* | 12/2013 | Matsumoto et al. | 49/279 |
| 2002/0117863 A1* | 8/2002 | Shinkawa | 292/216 |
| 2003/0067175 A1* | 4/2003 | Shiota et al. | 292/201 |
| 2004/0227357 A1* | 11/2004 | Ishihara et al. | 292/216 |
| 2006/0175845 A1* | 8/2006 | Arabia et al. | 292/341.16 |
| 2006/0290142 A1* | 12/2006 | Tani et al. | 292/201 |
| 2009/0151257 A1* | 6/2009 | Dominique | 49/280 |
| 2009/0267359 A1* | 10/2009 | Takayanagi et al. | 292/201 |
| 2010/0064588 A1* | 3/2010 | Jitsuishi et al. | 49/358 |
| 2010/0194122 A1* | 8/2010 | Akizuki et al. | 292/216 |
| 2010/0270815 A1* | 10/2010 | Shinoda et al. | 292/201 |
| 2011/0167730 A1* | 7/2011 | Itami et al. | 49/279 |
| 2012/0061977 A1* | 3/2012 | Takeda | 292/201 |
| 2012/0248796 A1* | 10/2012 | Kurebayashi | 292/201 |
| 2013/0249222 A1* | 9/2013 | Yokomori et al. | 292/201 |

* cited by examiner

VEHICLE DOOR CLOSER DEVICE

BACKGROUND OF THE INVENTION

The present invention relates to a vehicle door closer device for moving a door from a half-latch state to a full-latch state to slide the door fully closed and for releasing a latch mechanism to enable the door to open.

A vehicle door closer device in JP2007-138530A comprises a drive gear fixed to a rotary shaft of an electric motor; a sun gear rotatably mounted and having teeth which mesh with the drive gear; a ring gear having an engagement portion on the outer circumference and pivoting with the sun gear on a shaft, the engagement portion engaging with an engagement member to disable the ring gear to turn and release from the engagement member to enable the ring gear to turn; a planetary gear which meshes with the sun gear and ring gear; a carrier mounted with the sun gear via the shaft and coupled to the planetary gear, the planetary gear orbiting while it turns on its own axis with respect to the ring gear engaged not to rotate by the engagement member with rotation of the sun gear; and a planetary gear mechanism including a drive lever turning together with the carrier. A rotary power supplied from the carrier is transmitted to a latch of a latch mechanism for holding the door in a half-latch state and a full-latch state via the drive lever, thereby moving the latch from the half-latch state to the full-latch state to close the door fully.

In the door closer device, a reduction mechanism for slowing down the motor comprises a planetary gear mechanism. The fewer steps achieve larger reduction ratio to enable the device to become smaller. The device provides closing function for moving the latch from the half-latch position to the full-latch position, but does not provide releasing function for moving a ratchet which engages with the latch in a releasing direction to enable the door to open.

Furthermore, a vehicle door closer device in JP2004-293038A comprises a latch mechanism which engages with a striker of a vehicle body to hold a door closed; and a drive mechanism for slowing down a motor as electric drive source to supply the reduced power by a rotary member. The vehicle door closer device provides closing function for changing the latch mechanism from a half-latch state to a full-latch state by turning the rotary member by the motor in one direction; and releasing function for releasing the latch mechanism by the rotation to enable the door to open.

In the vehicle door closer device, in releasing action where a rotary member turns in another direction by the motor, electric trouble occurs, so that the rotary member is held in released state, the latch mechanism is moved with it and the latch mechanism does not engage from the striker to disable the door to close.

SUMMARY OF THE INVENTION

In view of the disadvantages in the prior art, it is an object of the invention to provide a vehicle door closer device providing both closing function and releasing function and enabling the device to become smaller.

It is another object of the present invention to provide a vehicle door closer device enabling release-holding state to be canceled immediately.

DETAILED DESCRIPTION OF PREFERRED EMBODIMENT

One embodiment of the present invention will be described with respect to the drawings. In the following description, the left and right sides are deemed as "rear" and "front" of a vehicle respectively in FIG. 1 and FIGS. 7-14.

Figure 1:
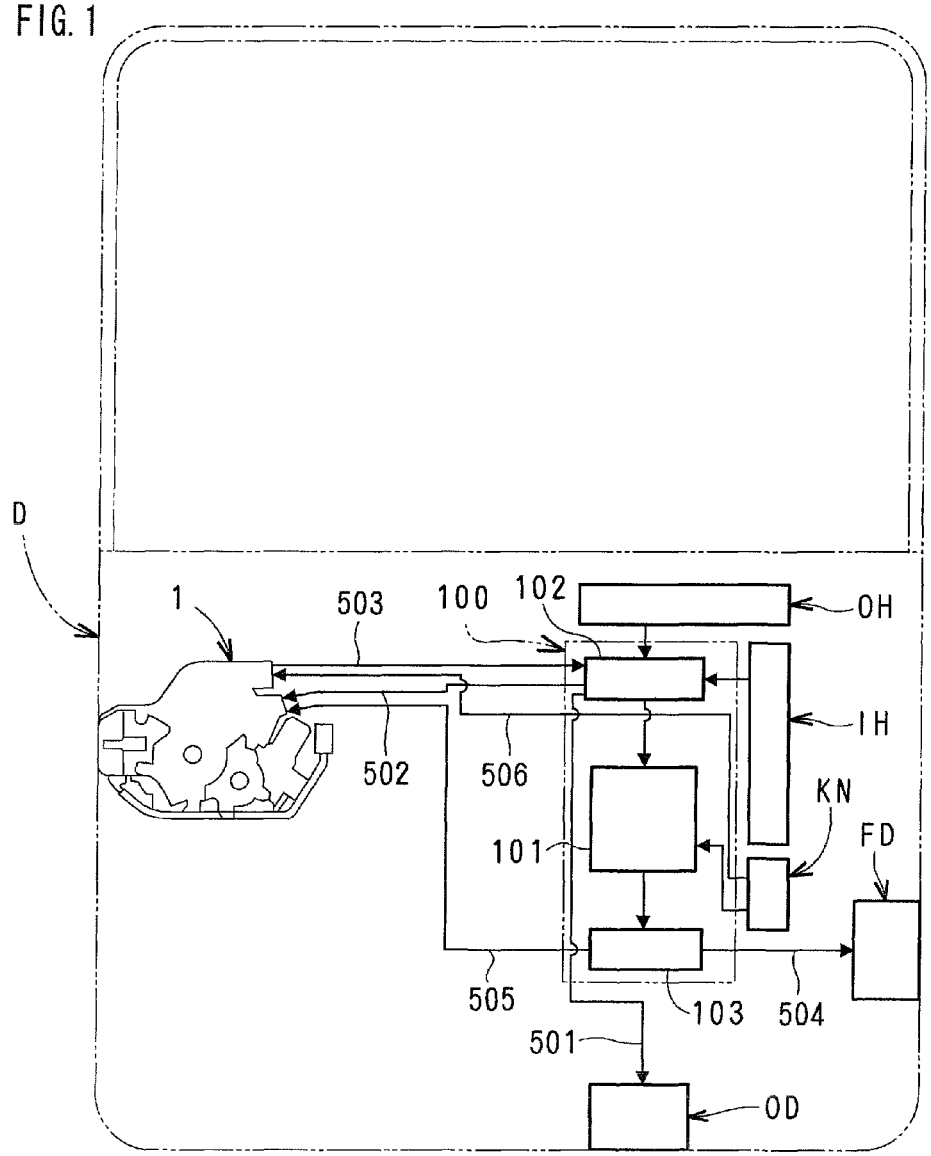
FIG. 1 is a view of a door having a door closer device according to the present invention.

In FIG. 1, D denotes a sliding door that slides open and closed; OH denotes an outside handle on the outer panel of the door D to open and close the door D; IH denotes an inside handle on the inner panel inside the vehicle; KN denotes a locking knob disposed on the inner panel of the door D to change unlocking and locking of a locking/unlocking mechanism 101 later described; FD denotes a front-door-latch section disposed at the front of the door D to hold the door D closed; OD denotes a fully-open holding latch at the lower end of the door D to hold the door in a fully-open position; 1 denotes a door closer device at the rear of the door D to hold the door D closed with the front-door-latch section FD; and 100 denotes a motion-connecting section disposed in the door D to control motion by the outside handle OH and the inside handle IH to transmit motion to the door closer device 1, front door-latch section FD and fully-open holding latch OD.

The motion-connecting section 100 comprises a locking/unlocking mechanism 101 that comprises a plurality of levers which change to an unlocking state enabling the door D to open by operating the outside handle OH and inside handle IH with the locking knob KN and an electric actuator (not shown); and a locking state disabling the door D to open; a handle-connecting lever 102 which is moved with the outside handle OH and inside handle IH regardless of the locking/unlocking mechanism; and an output lever 103 which actuates with the outside handle OH and inside handle IH only when the locking/unlocking mechanism 101 is in the unlocking state. The handle-connecting lever 102 is connected to the fully-open holding latch OD and door closer device 1 via motion-transmitting members 501, 502, 503 such as a rod or a Bowden cable. The output lever 103 is connected to the front door latch section FD and door closer device 1 via motion-transmitting members 504,505 such as a rod or a Bowden cable.

Figure 2:
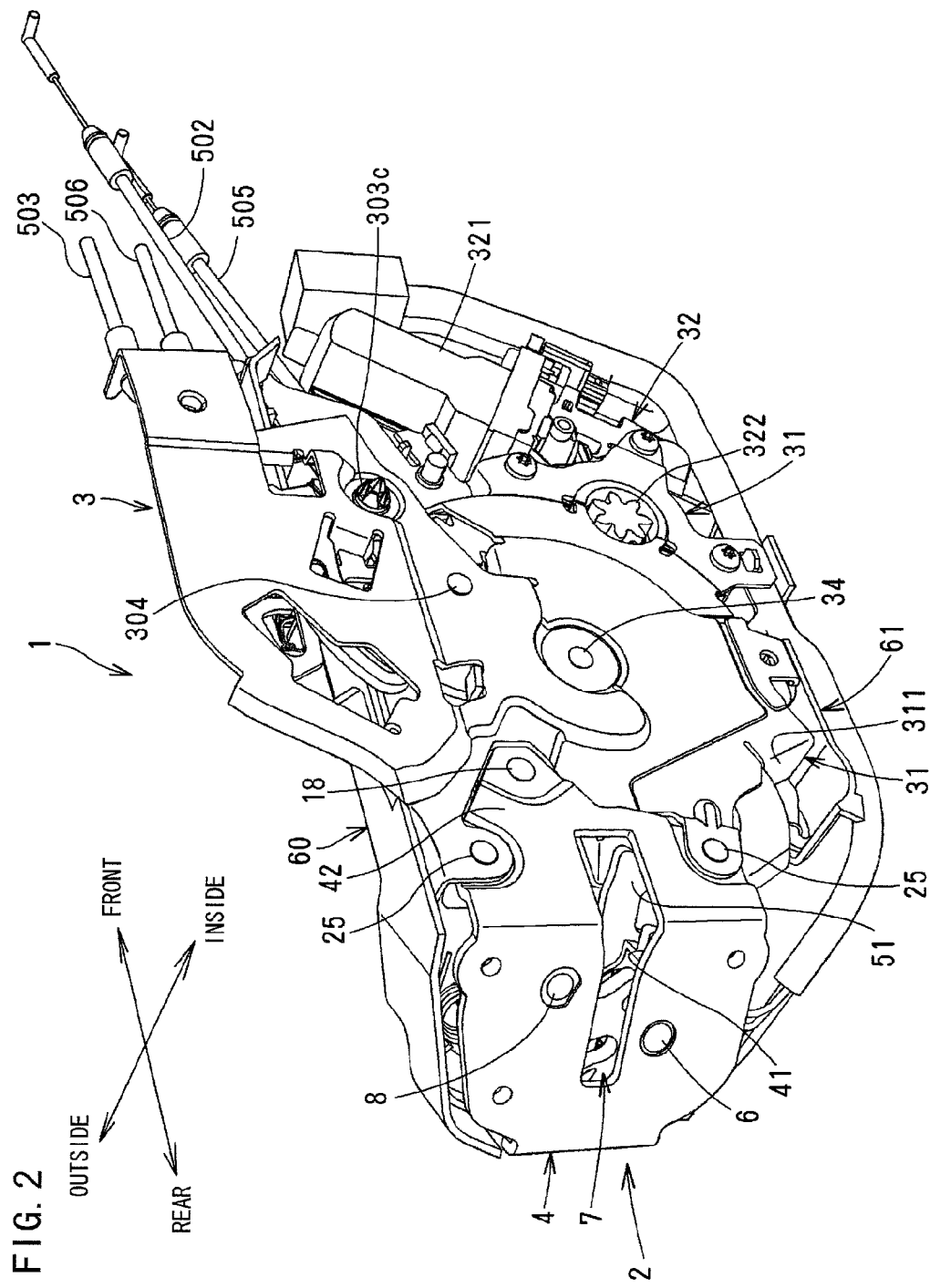
FIG. 2 is a perspective view of the door closer device seen from the inside of a vehicle.
Figure 3:
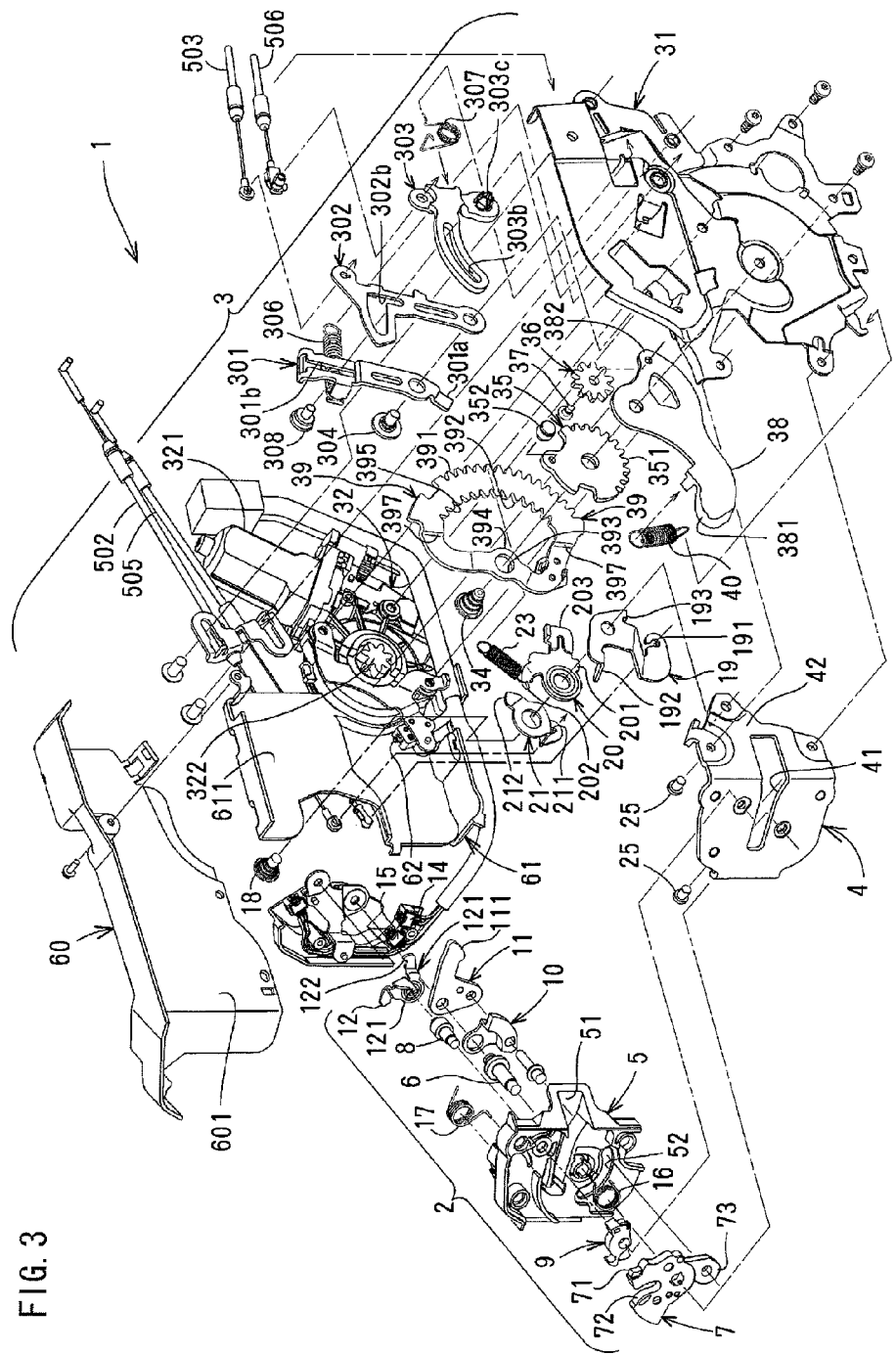
FIG. 3 is an exploded perspective view of the door closer device seen from the inside of the vehicle.
Figure 4:
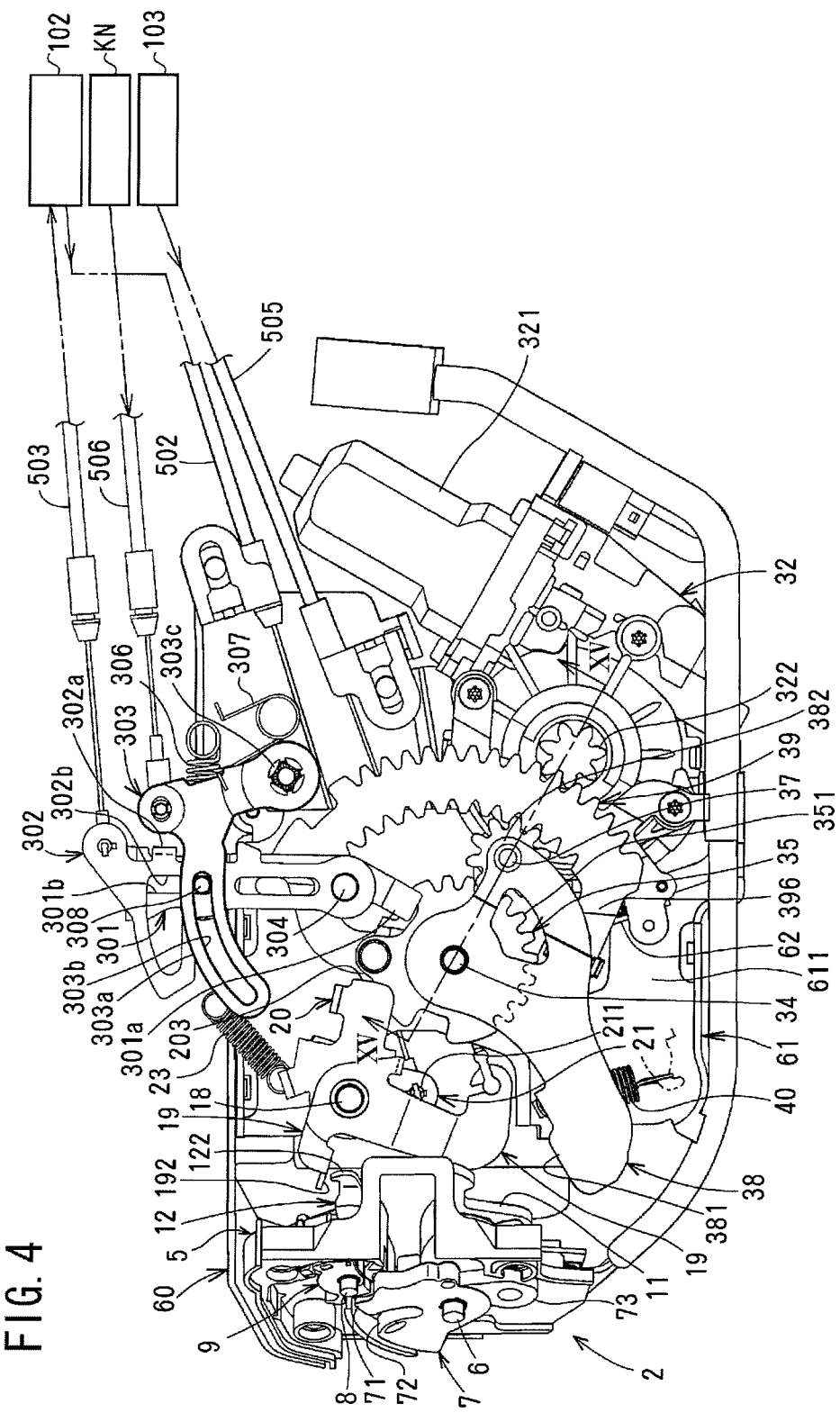
FIG. 4 is a front view of main part of the door closer device.

In FIGS. 2-4, the door closer device 1 comprises a latch unit 2 which engages with a striker S (in FIG. 5) fixed to a vehicle body to hold the door D closed; and a closer-release unit 3 providing closing function for actuating the latch unit 2 from the half-latch state to the full-latch state to forcedly close the door D from the half-latch state (not shut properly) to the full-latch state (fully-closed state) when the door D is closed and releasing function for releasing the latch unit 2 from the striker S.

The door closer device 1 is defined as the structure that provides one or both of the closing and releasing functions in addition to a latch mechanism including the latch 7 and ratchet 9.

The top of the latch unit 2 and closer-release unit 3 is covered with a synthetic-resin top cover 60 for keeping rain and dust from coming in, and the bottom of the closer-release unit 3 is covered with a synthetic-resin bottom cover 61 from keeping rain and dust from coming in. A planetary gear mechanism 33 (later described) of the closer-release unit 3 is covered at the side facing the outside of the vehicle with a side wall 601 of the top cover 60 and a side wall 611 of the bottom cover 61.

The latch unit 2 will be described.

In FIGS. 2-6, the latch unit 2 comprises a synthetic-resin housing 5 closed by an L-shaped metal cover plate 4 mounted to the door D. Within the housing 5, there is a latch mechanism which comprises a latch 7 pivoted on a ratchet shaft 6 to engage with a striker S and a ratchet 9 pivoted on a ratchet shaft 8 which selectively engages with a full-latch engagement portion 71 or a half-latch engagement portion 72 on the outer circumference of the latch 7. In FIG. 4, the cover plate 4 is omitted so that the internal structure of the latch unit 2 may be shown clearly.

In the cover plate 4 and housing 5 of the latch unit 2, there are striker-entering grooves 41,51 into which the striker S comes when the door D is closed.

Figure 5:
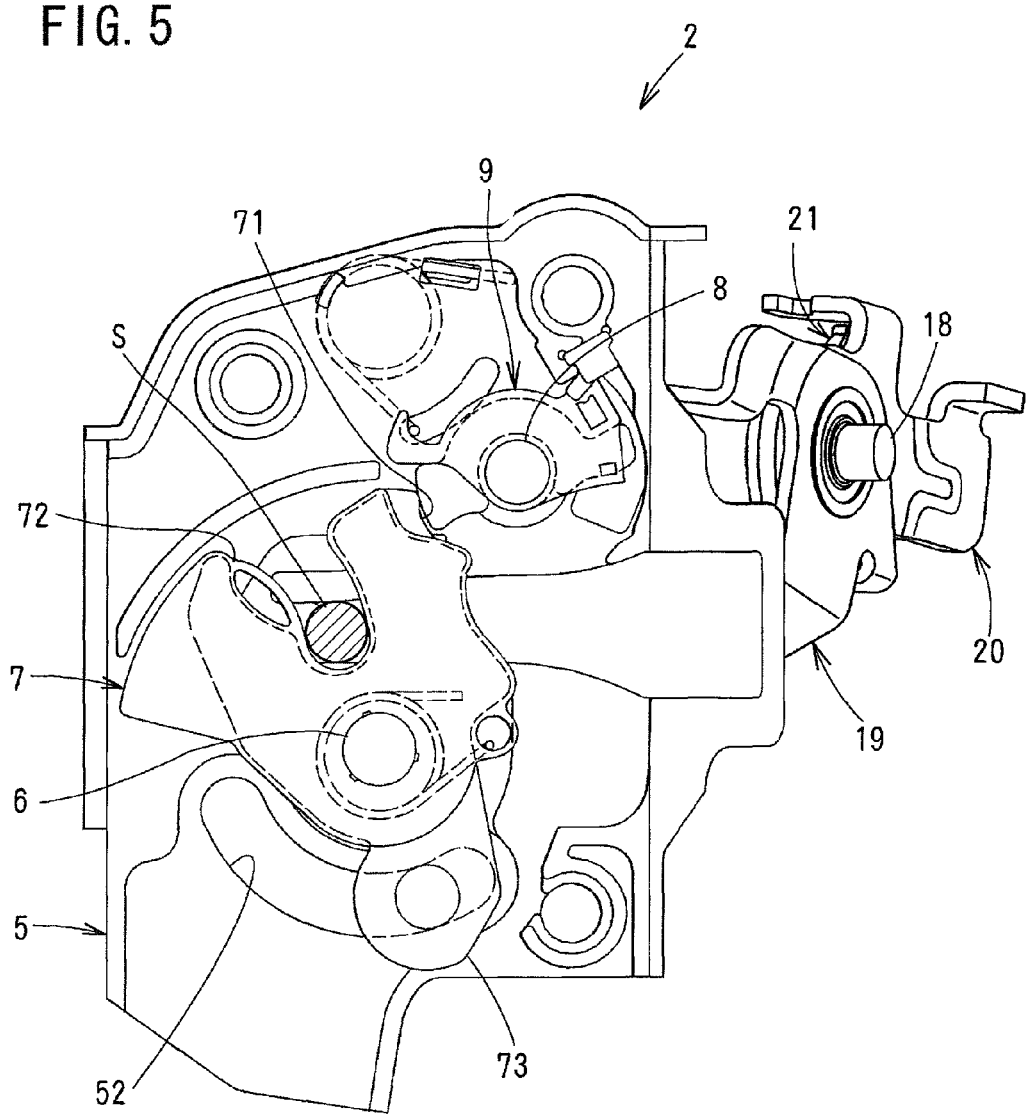
FIG. 5 is a side view seen from the front to show the inside of a latch unit clearly.
Figure 7:
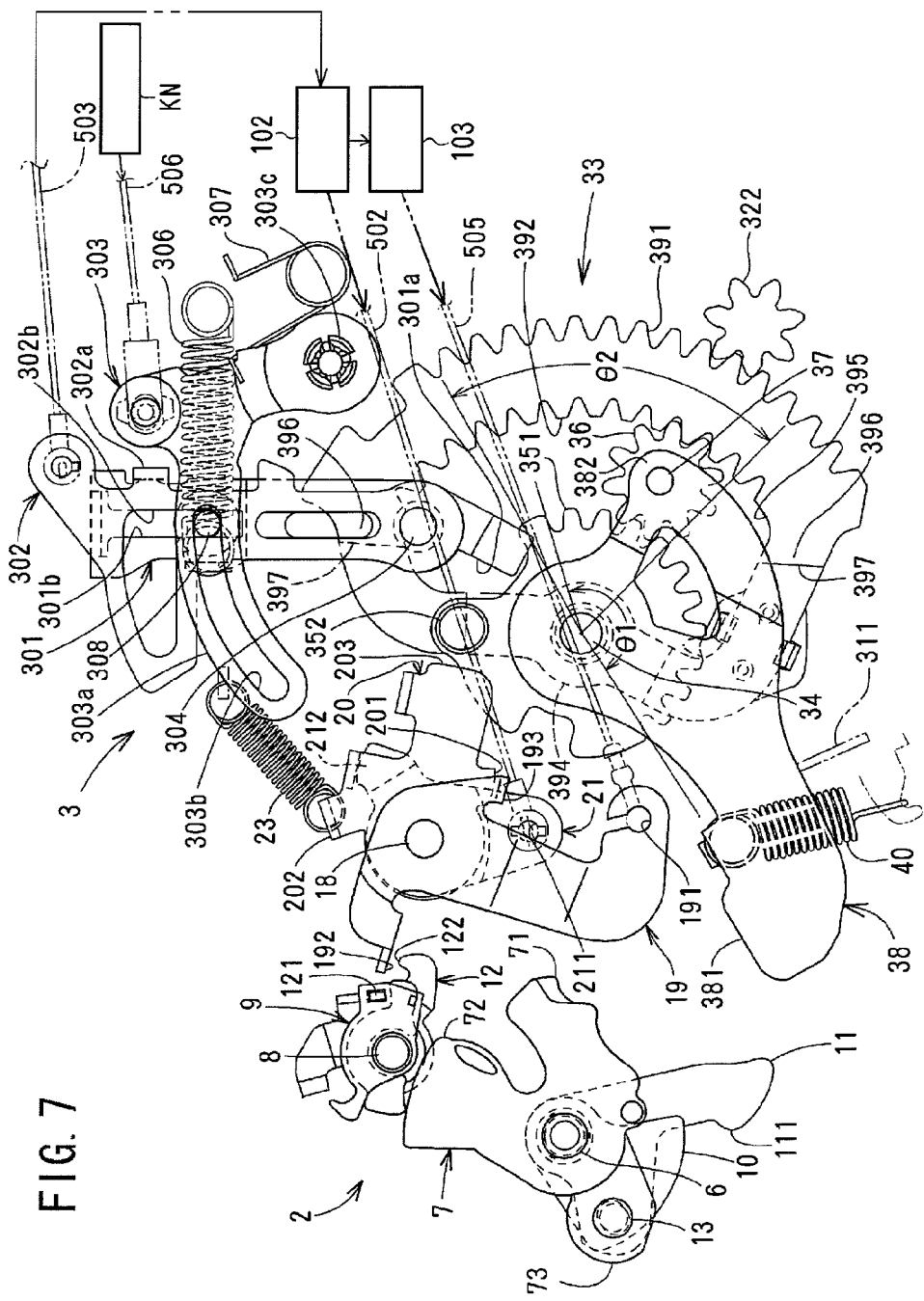
FIG. 7 is a front view of the door closer device in an open state.
Figure 8:
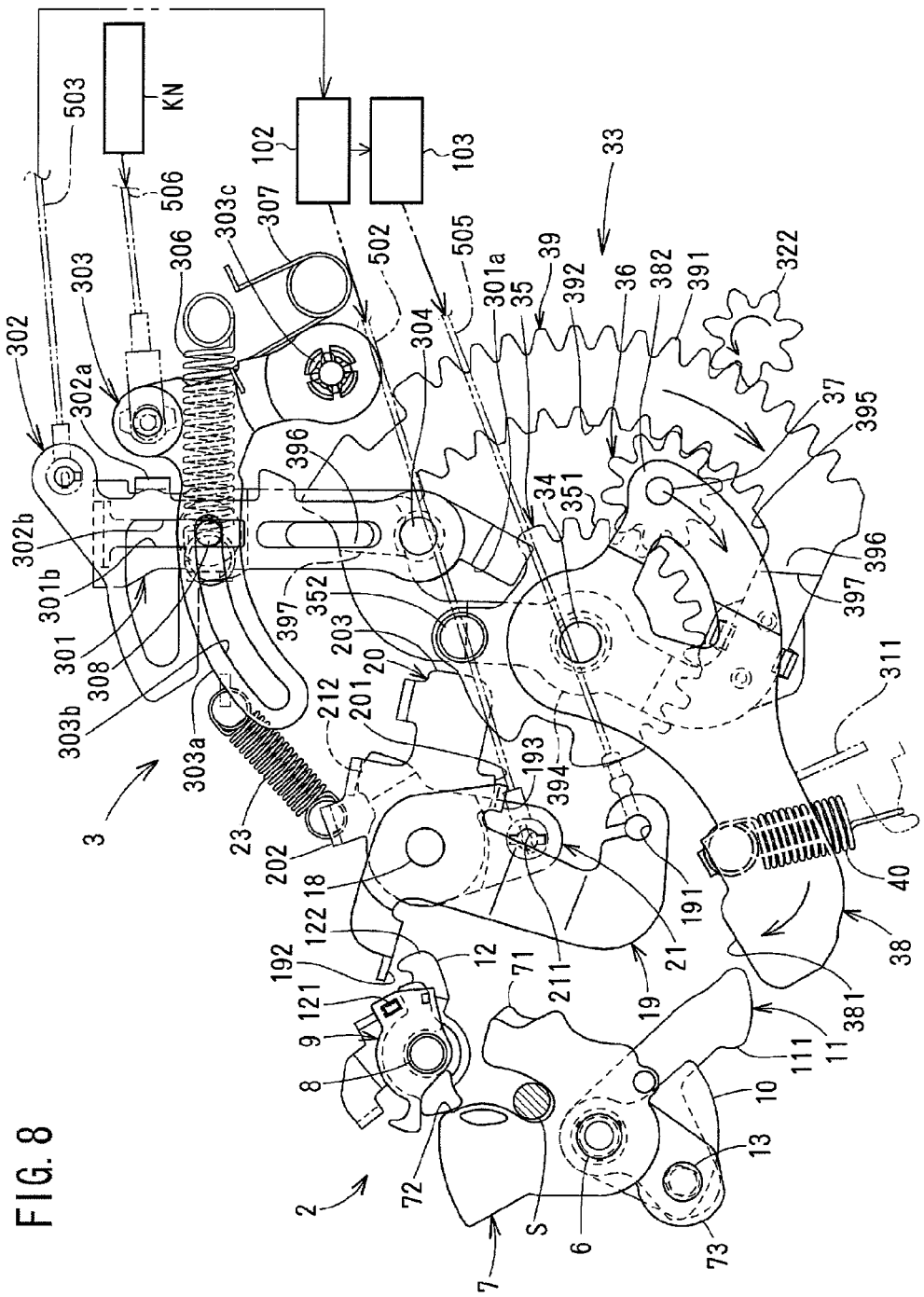
FIG. 8 is a front view of the door closer device in a half-latch state.
Figure 9:
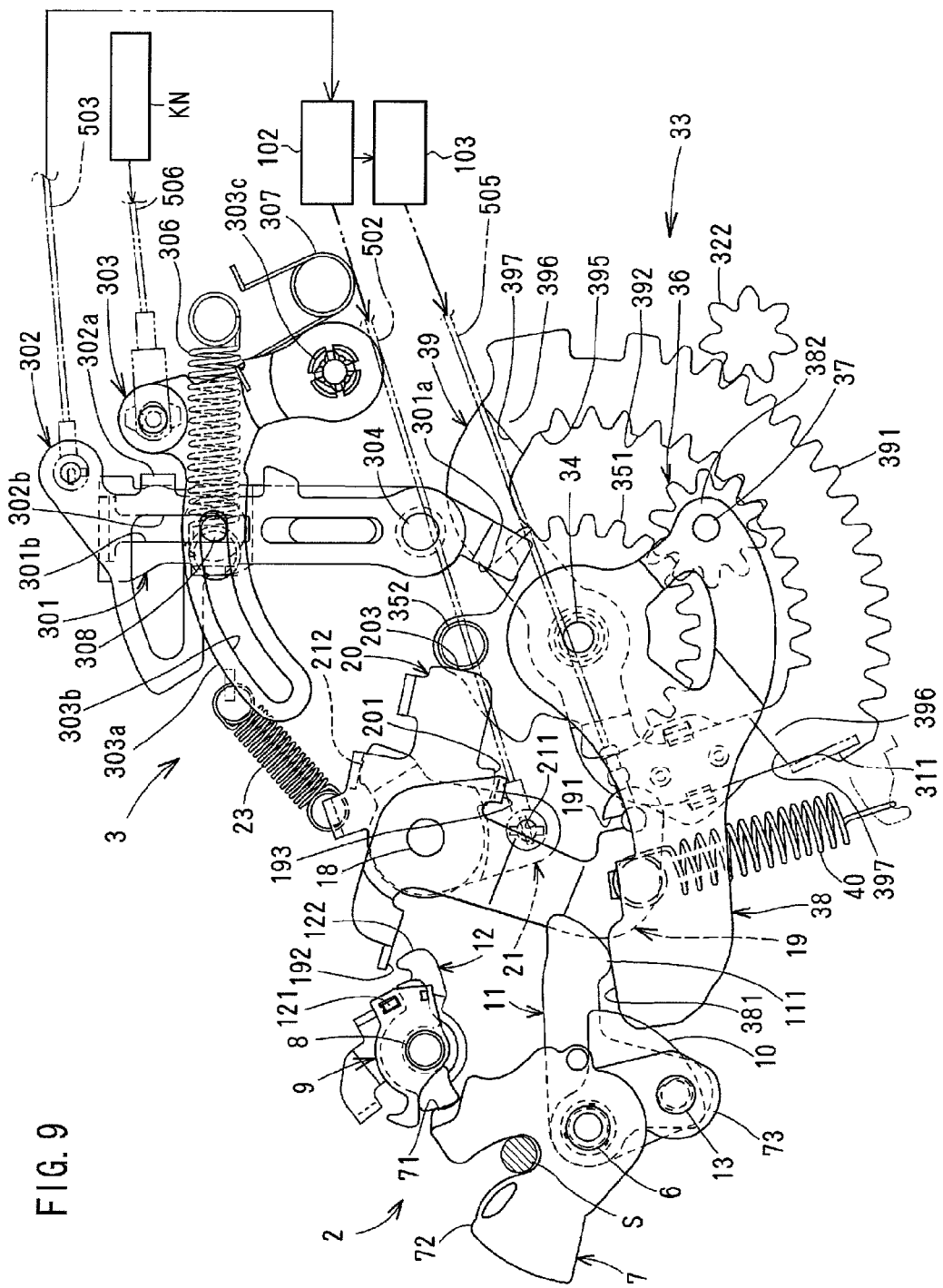
FIG. 9 is a front view of the door closer device during closing action.
Figure 10:
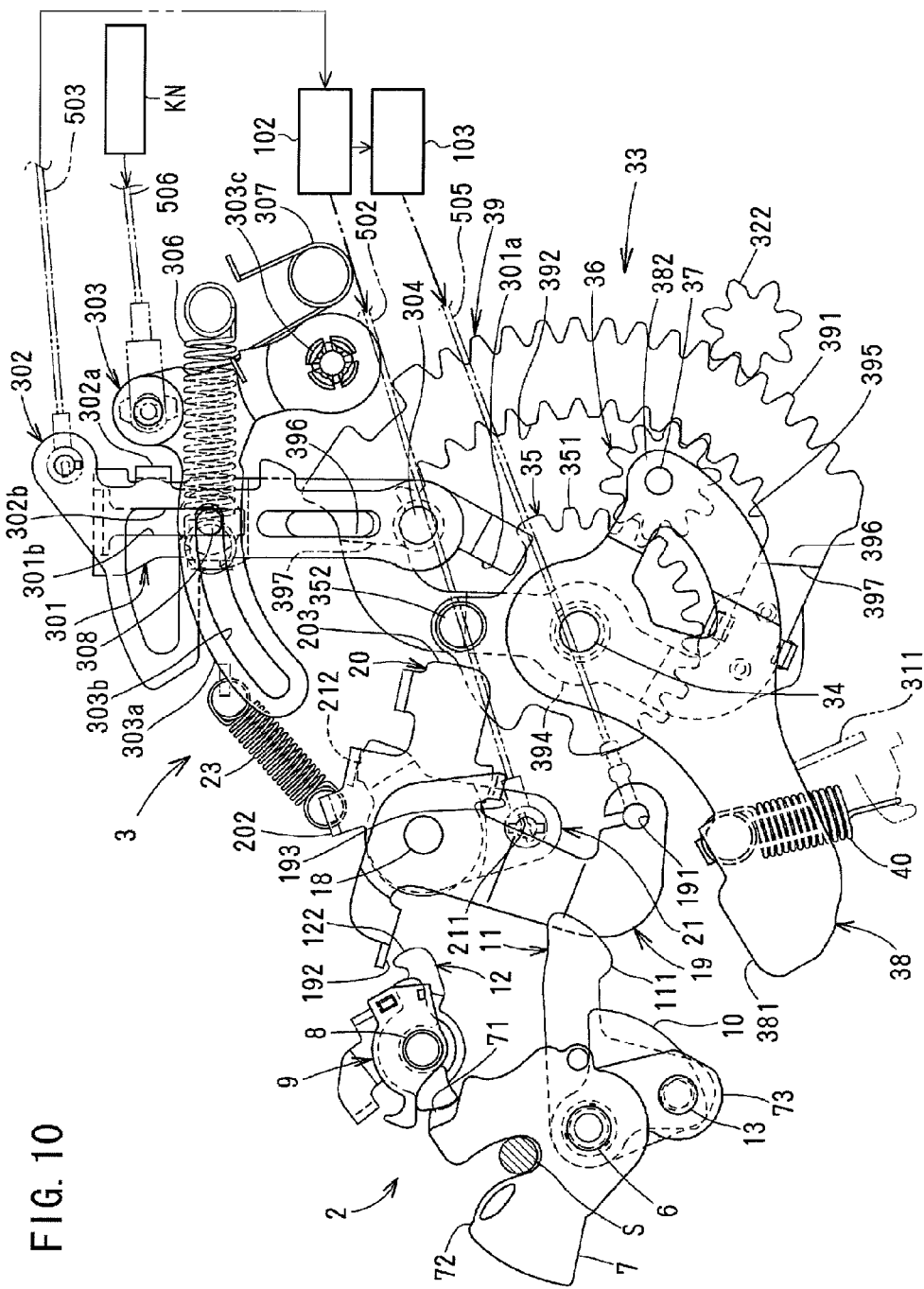
FIG. 10 is a front view of the door closer device in a full-latch state.

The latch 7 turns counterclockwise in FIG. 7 or in a closing direction against a spring 16 wound on the latch shaft 6 from an open position in FIG. 7 where the latch 7 leaves the striker S when the door D is open to a full-latch position in FIGS. 5, 9 and 10 where the latch 7 completely engages with the striker S via a half-latch position in FIG. 8 wherein the latch 7 slightly engages with the striker S. In the following description, "open position", "half-latch position" and "full-latch position" of the latch 7 can be also mentioned "open state", "half-latch state" and "full-latch state" of the latch mechanism, if required.

Figure 6:
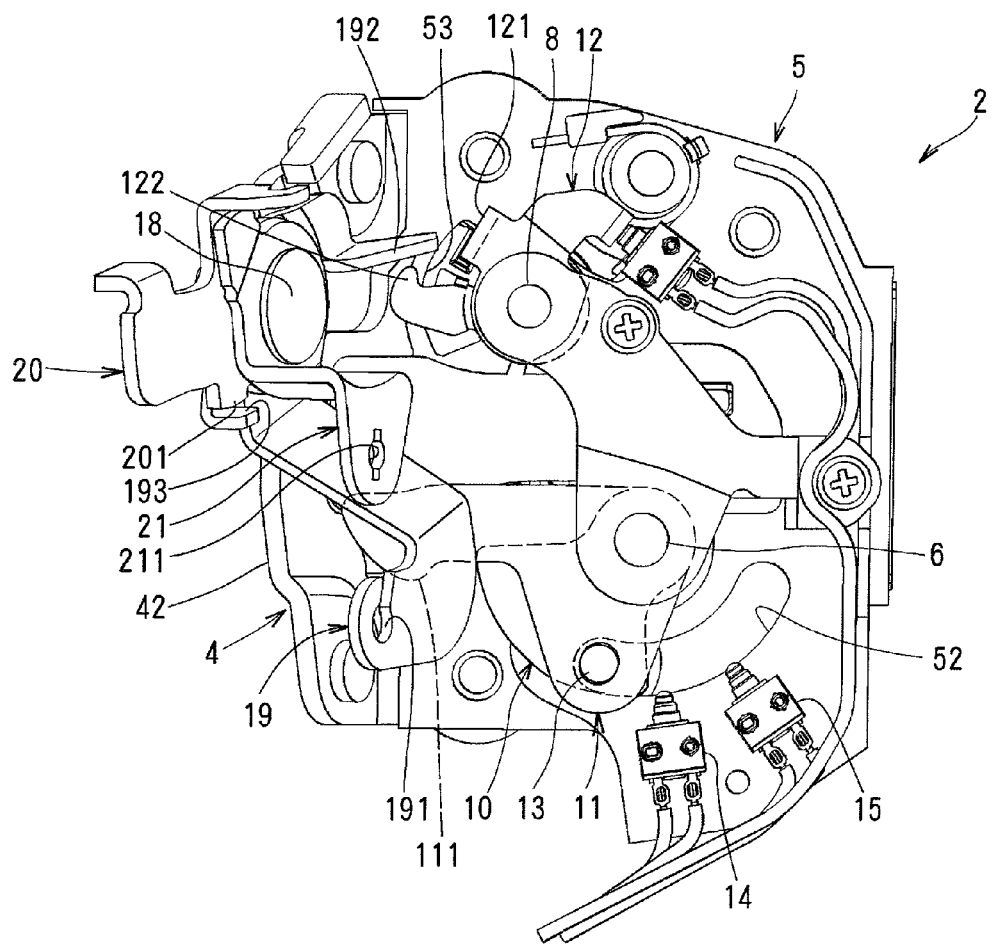
FIG. 6 is a side view of the latch unit seen from the rear.

In FIG. 6, in the front face of the housing 5, there are a detecting lever 10 and a latch lever 11 pivoted on the latch shaft 6 to turn together with the latch 7, and an opening lever 12 pivoted on the ratchet shaft 8 to turn together with the ratchet 9.

The latch lever 11 which turns with the latch 7 is directed downward in FIG. 7 when the latch 7 is in the open position obliquely forward and downward in FIG. 8 when the latch 7 is in the half-latch position and forward in FIG. 9 when the latch 7 is in the full-latch position. An actuated portion 111 at the end of the latch lever 11 goes out of a moving path of a closing portion 381 of a closing lever 38 (later described) of the planet gear mechanism 33 and comes in the moving path of the closing portion 381 by turning the latch 7 to the half-latch position.

On the rotary surfaces of the detecting lever 10 and latch lever 11, a connecting shaft 13 is fixed. The connecting shaft 13 passes through an arcuate hole 52 around the latch shaft 6 of the housing 5 and is fixed to an arm 73 of the latch 7 thereby connecting the detecting lever 10, latch lever 11 and latch 7 to turn together.

A first arm 121 of the opening lever 12 passes through an arcuate hole 53 around the ratchet shaft 8 of the housing 5 and engages with the ratchet 9 to turn with the ratchet 9.

The half-latch position and full-latch position of the latch 7 are detected by a half-latch detecting switch 14 and a full-latch detecting switch 15 on the front face of the housing 5. A detected signal is transmitted to control circuits (not shown) to trigger stop and drive control of a motor 321 of the closer-release unit 3.

The ratchet 9 is forced any time with the opening lever 12 by a spring 17 on the front face of the housing 5 in an engagement direction or counterclockwise in FIGS. 5 and 7-14. The ratchet 9 is in contact with the outer circumference of the latch 7 when the latch 7 is in the open position in FIG. 7, and is held in an engagement position where the ratchet 9 engages with the half-latch engagement portion 72 of the latch 7 when the latch 7 is in the half-latch position in FIG. 8 to prevent the latch 7 from turning from the half-latch position in an opening direction or clockwise in FIGS. 8 and 9. When the latch 7 is in the full-latch position in FIG. 9, the ratchet 9 engages with the full-latch engagement portion 71 of the latch 7 to prevent the latch 7 from moving in an opening direction from the full-latch position.

Figure 11:
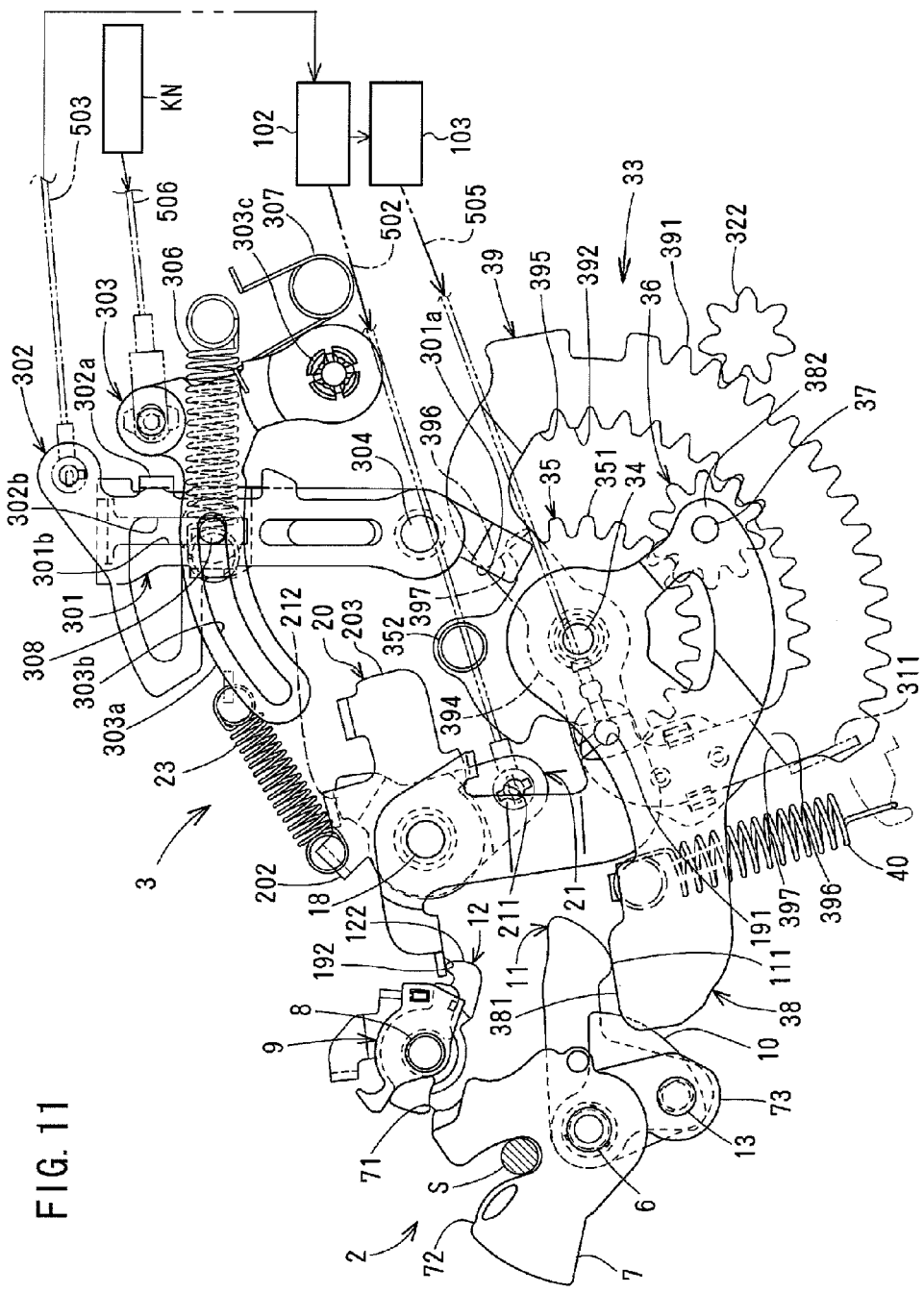
FIG. 11 is a front view the door closer device when closing action is cancelled.
Figure 12:
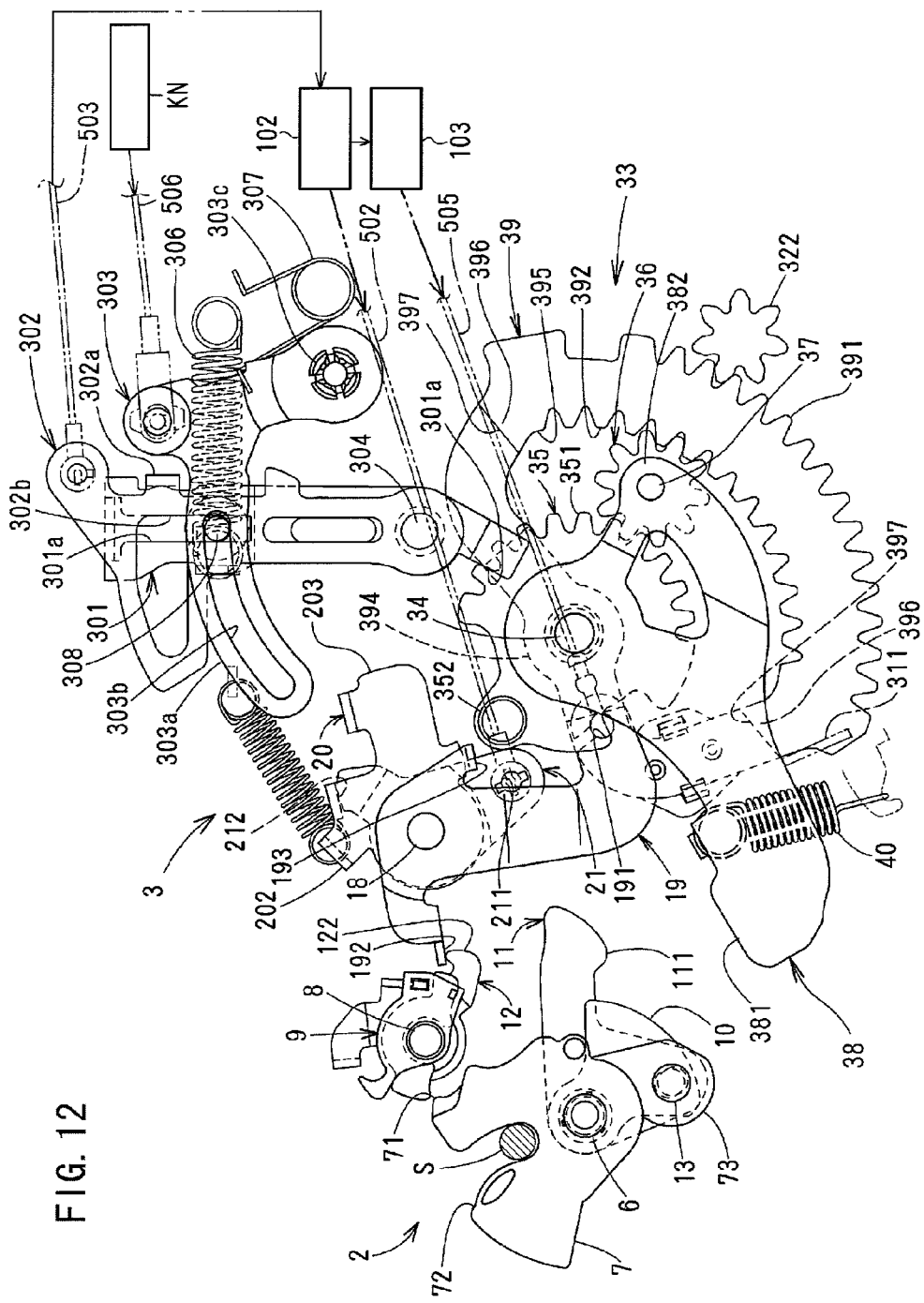
FIG. 12 is a front view of the door closer device after closing action is cancelled.

In the engagement position where the ratchet 9 is in contact with the full-latch engagement portion 71 or half-latch engagement portion 72 of the latch 7, when the locking/unlocking mechanism 101 of the motion-connecting section in the locking position, so that the outside handle OH or inside handle IH is operated to open the door D, the ratchet 9 swings via each element against the spring 17 in the releasing direction or clockwise in FIGS. 5 and 7-14 to move to the releasing position in FIGS. 11 and 12 and leaves the full-latch engagement portion 71 or half-latch engagement portion 72 to enable the door D to open.

A release input lever 19, a blocking lever 20 and an emergency lever 21 are pivotally mounted on a support surface 42 which is bent in the cover plate 4 via a pivot shaft 18 extending transversely of the vehicle.

A connecting portion 191 at the lower part of the release-input lever 19 is connected to the rear end of the motion-transmitting member 505 disposed longitudinally of the vehicle in the door D. The front end of the motion-transmitting member 505 is coupled to an output lever 103 of the motion-connecting section 100. Hence, the outside handle OH or inside handle IH is operated to open the door D, and only when the locking/unlocking mechanism 101 of the motion-connecting section is in the unlocking state, the release-input lever 19 swings against the spring 23 from a neutral position in FIGS. 7-10 in a releasing direction or counterclockwise in FIGS. 7-10 and turns to the released position in FIGS. 11 and 12. When the release input lever 19 turns to the released position, a releasing portion 192 at the rear end of the release input lever 19 pushes down the upper end of a second arm 122 of the opening lever 12 and turns the ratchet 9 to turn in a releasing direction via the opening lever 12 to disengage the ratchet 9 from the full-latch engagement portion 71 or half-latch engagement portion 72 of the latch 7 to enable the door D to open.

Because the release-input lever 19 is coupled to the output lever 103 of the motion-connecting section 100, it swings in the releasing direction by door-opening action of the outside handle OH or inside handle IH when the locking/unlocking mechanism 101 is in the unlocking state. But the release-input lever 19 still remains in the neutral position, but does not swing in the releasing direction even if the outside handle OH and inside handle IH are operated to open the door D when the locking/unlocking mechanism 101 is in the locking state.

The blocking lever 20 is held by the spring 23 in a blocking position in FIGS. 7-10 where a blocking portion 203 at the end of an arm is directed forward and the release-input lever 19 turns in the releasing direction to the releasing position. A contact portion 201 of the blocking lever 20 comes in contact with a bent portion 193 of the release-input lever 19 upward, so that the blocking lever 20 turns counterclockwise from the blocking position to a canceling position in FIGS. 11 and 12.

When the blocking lever 20 is held in the blocking position, the blocking portion 203 prevents a sun gear 35 (later described) of the planetary gear mechanism 33 from turning counterclockwise and moves to the canceling position enabling the sun gear 35 to turn freely counterclockwise. Hence, when the blocking lever 20 is in the blocking position, reduced rotation of the planetary gear mechanism 33 can be transmitted to the latch 7. In the canceling position, reduced rotation of the planetary gear mechanism 33 is disconnected and cannot be transmitted to the latch 7.

A coupling portion 211 at the lower end of the emergency lever 21 is coupled to the rear end of the motion-transmitting member 502 disposed longitudinally of the vehicle in the door D. The front end of the motion-transmitting member 502 is coupled to the handle-connecting member 102 of the motion-connecting section 100. Hence, the motion of the handle-connecting lever 102 is transmitted to the emergency lever 21 via the motion-transmitting member 502. Whether the locking/unlocking mechanism 101 is in the unlocking or locking state, the emergency lever 21 moves together with door-opening motion of the outside handle OH or inside handle IH and turns from the neutral position in FIGS. 7-10 in the releasing direction or counterclockwise in FIGS. 7-10.

When the emergency lever 21 turns in the releasing direction, the contact portion 212 comes in contact with a bent portion 202 of the blocking lever 20 upward, so that the blocking lever 20 turns in the releasing direction against the spring 23. In the case, the release-input lever 19 is still held in the neutral position, the ratchet 9 does not swing in the releasing direction. Hence, regardless of the state of the locking/unlocking mechanism 101, any one of the outside handle OH and inside handle IH is operated to open the door D, so that the blocking lever 20 is moved to the canceling position to enable closing action of the closer-release unit 3 to stop as described later.

Then, the closer-release unit 3 will be described.

In FIGS. 2-4, the closer-release unit 3 comprises a metal base member 31 with two upper and lower rivets 25 to a support surface 42 of the cover plate 4 of the latch unit 2; a drive unit 32 disposed on the front part facing the outside of the vehicle and including a motor 321 as electric drive source and a reduction gear for slowing down the motor 321; the planetary gear mechanism 33 disposed in the middle of the base member 31 between the latch 7 of the latch unit 2 and the drive unit 32 and meshing with an output gear 322 rotated by the motor 321 to slow down the rotation of the output gear 322; and a release-canceling mechanism including a first release-output lever 301, a second release-output lever 302 and a canceling lever 303.

The first release-output lever 301 is pivotally mounted to the base member 31 via a pivot shaft 304 extending transversely of the vehicle and comprises a releasing portion 301a extending downward and an elongate hole 301b though which a floating pin 308 slides vertically. The first release-output lever 301 is forced clockwise by a spring 306 in a neutral position in FIG. 4 when it is not operated and is capable of turning against the spring 306 from the neutral position in a releasing direction or counterclockwise in FIG. 4 based on releasing action (later described) of the planetary gear mechanism 33.

The second release-output lever 302 is pivoted to the base member 31 via the same shaft for the first release-output lever 301. In order to move with the motion of the first release lever 301 in a neutral direction, a bent portion 302a at the upper part comes in contact with the first release-output lever 301 in a rotational direction.

To the upper end of the second release-output lever 302 is coupled the rear end of a motion-transmitting member 503 for transmitting motion of the second release-output lever 302 from the neutral position in FIG. 4 in a releasing direction or counterclockwise in FIG. 4 to the handle-connecting lever 102 of the motion-connecting section 100. Furthermore, an inverted L-shaped 302b in which the floating pin 308 slides is formed in the second release-output lever 302.

The canceling lever 303 is pivotally mounted to the base member 31 via a pivot shaft 303c extending transversely of the vehicle and is held in a connecting position in FIG. 4 by a spring 307. In an arm 303a which extends rearward of the canceling lever 303 is formed an elongate hole 303b in which a floating pin 308 slides. The elongate hole 303b overlaps the elongate hole 302b of the second release-output lever 302.

To the upper part of the canceling lever 303 is coupled the front end of a motion-transmitting member 506 for transmitting unlocking or locking motion of the locking knob KN. Hence, the canceling lever 303 is usually in the connecting position, but in emergency, the locking knob KN is operated to lock and unlock the door manually by a passenger. The canceling lever 303 moves to a disconnected position in FIG. 14 against the spring 306 in a disconnecting direction or clockwise in FIG. 4 with the action of unlocking or locking.

The floating pin 308 follows the movement of the canceling lever 303 and is positioned in the lower part of the elongate hole 302b of the second release-output lever 302 when the canceling lever 303 is in the connecting position, and a motion-transmitting path is connected between the first release-output lever 301 and the second release-output lever 302 to enable releasing action of the first release-output lever 301 to be transmitted to the second release-output lever 302. When the canceling lever 303 is in the disconnected position, the canceling lever 303 is positioned in the upper part of the elongate hole 302b. Hence, even if the first release-output lever 301 is held in the releasing position by any reason to disable it to return to the neutral position to produce release holding state, the motion-transmitting path is disconnected between the first release-output lever 301 and the second release-output lever 302 to release the release holding state to enable the second release-output lever 302 to return from the release-action position to the neutral position.

When the canceling lever 303 is in the disconnected position, the first and second release-output lever 301,302 are released, and the releasing is transmitted to the handle-connecting lever 102 of the motion-connecting section 100 via the motion-transmitting member 503 to actuate the handle-connecting lever 102. The action of the handle-connecting lever 102 is transmitted to the release-input lever and front door-latch device FD via the output lever 103, motion-transmitting members 505 and 504 when the locking/unlocking mechanism 101 of the motion-connecting section 100 is in the unlocking state.

The planetary gear mechanism 33 provides closing function for moving the latch mechanism of the latch unit 2 from the half-latch state to the full-latch state or moving the latch 7 from the half-latch position to the full-latch position, and releasing function for releasing the ratchet 9 to enable the door to open.

In FIG. 4, the planetary gear mechanism 33 comprises the sun gear 35 pivotally mounted to the base member 31 via a pivot shaft 34 which extends transversely of the vehicle; a single planetary gear 36 which meshes with the sun gear 35 to orbit about the sun gear 35 while the planetary gear 36 rotates on its own axis; a closing lever 38 pivotally mounted via the pivot shaft 34, the planetary gear 36 being pivotally mounted to the closing lever 38 via a shaft 37 extending transversely of the vehicle; and a ring gear or sector gear 39 pivotally mounted via the pivot shaft 34 and having external teeth 391 which mesh with the output gear 322 on the outer circumference and internal teeth 392 which mesh with the planetary gear 36 on the inner circumference.

In FIG. 7, on the outer circumference corresponding to approximately 170 degrees as a central angle θ1, the sun gear 35 has external teeth 351 which mesh with the planetary gear 36, and there is provided a cylindrical contact portion 352 which projects inward of the vehicle on the upper part which has not the external teeth 351.

The contact portion 352 is capable of coming in contact with the blocking portion 203 of the blocking lever 20 so that the sun gear 35 may be prevented from turning counterclockwise. The sun gear 35 turns clockwise and comes in contact with the releasing portion 301a of the first release-output lever 301 to move the first release-output lever 301 in the releasing direction. That is to say, the sun gear 35 can turn clockwise from FIG. 4, but cannot turn counterclockwise.

When the blocking lever 20 is in the blocking position in FIGS. 7-10, the blocking portion 203 of the blocking lever 20 is within the moving path of the contact portion 352, and the sun gear 35 turns counterclockwise from FIG. 7 slightly. The blocking portion 203 comes in contact with the contact portion 352 to block the sun gear 35 from turning counterclockwise. When the blocking lever 20 is in the canceling position in FIGS. 11 and 12, the blocking portion 203 of the blocking lever 20 goes out of the moving path of the contact portion 352 to enable the sun gear 35 to run counterclockwise.

When the planetary gear mechanism 33 does not work in the neutral state, the sun gear 35 is set in the neutral position where the external teeth 351 is in the bottom and the contact portion 352 is in the top.

In this embodiment, the external teeth 351 is formed on the outer circumference corresponding to approximately 170 degrees as central angle, but this invention is not limited thereto. The central angle of the sun gear 35 may range from 90 to 180 degrees.

In FIG. 7, at one end of the arm of the closing lever 38, the closing lever 38 has the upward-projecting closing portion 381 which can come in contact with the actuated portion 111 of the latch lever 11a, and a pivot portion 382 for mounting the planetary gear 36 to the shaft 37 pivotally at the other end remote from the latch 7 with respect to the pivot shaft 34.

In the neutral state in FIG. 7 of the planetary gear mechanism 33, the closing lever 38 is forced counterclockwise by a spring 40 one end of which engages with the closing lever 38 and the other end of which engages with the base member 31 to come in contact with a stopper 311 of the base member 31 downward. The planetary gear mechanism 33 is held in the neutral position where the closing portion 381 is directed obliquely rearward and downward and the pivot portion 382 is directed forward and obliquely downward or toward the output gear 322. When the closing lever 38 is in the neutral position, the planetary gear 36 and output gear 322 face each other, holding the external teeth 391 and internal teeth 392 of the sector gear 39 therebetween. Hence, when the planetary gear mechanism 33 is in the neutral position, the external teeth 391 and internal teeth 392 of the sector gear 39 are held between the planetary gear 36 and the output gear 322, thereby preventing the sector gear 39 from loosening.

In FIG. 7, the sector gear 39 has the external teeth 391 on the outer circumference and internal teeth 392 on the inner circumference of a sector corresponding to approximately 80 degrees as central angle θ2, and has a support portion 394 having an axial hole 393 through which the pivot shaft 34 passes and an opening 395 in which the planetary gear 36 meshes with the internal teeth 392 between the support portion 394 and the internal teeth 392. The planetary gear 36 revolves in the opening 395 while it turns on its own axis.

In the neutral state of the planetary gear mechanism 33, the sector gear 39 is set in the ring gear neutral position where the external teeth 391 is directed forward or in a direction opposite the latch 7 of the latch unit 2. The ring gear neutral position of the sector gear 39 is detected by a detecting switch 62 positioned under the sector gear 39.

Figure 15:
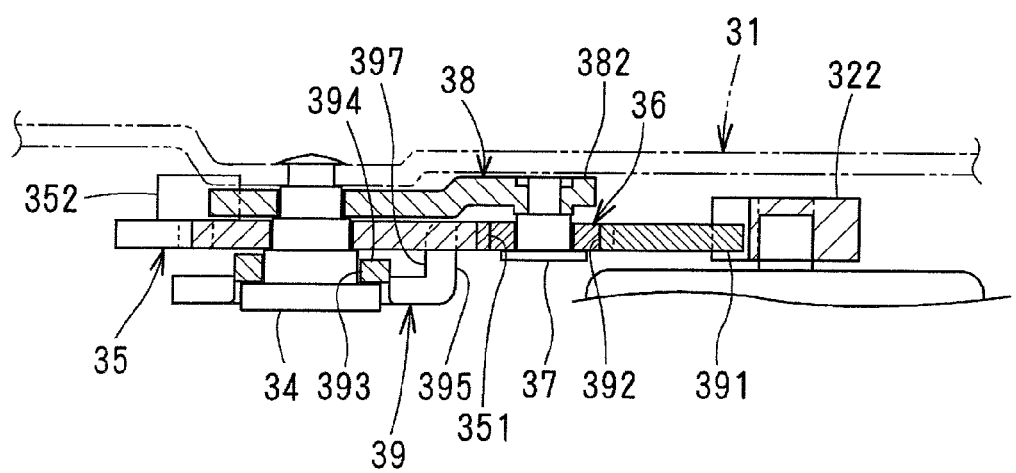
FIG. 15 is a sectional view taken along the line XV-XV in FIG. 4.

On upper and lower bridges 396 between the support portion 394 of the sector gear 39 and circumference on which the external teeth 391 and internal teeth 392 are formed, a step 397 is formed such that the circumference gets closer to the surface of the base member 31 than the support portion 394. Hence, in FIG. 15, the closing lever 38, sun gear 35 and sector gear 39 are overlapped on the base member 31 axially, and the external teeth 351 of the sun gear 35, planetary gear 36, external and internal teeth of the sector gear 39 and output gear 322 are arranged in substantially the same surface, making the pivot shaft 34 of the planetary gear mechanism 33 thinner axially and achieving smooth operation.

In FIG. 7, when the blocking lever 20 and planetary gear mechanism 33 are in the blocking position and neutral state respectively, the sector gear 39 turns clockwise in a closing direction around the pivot shaft 34, and the planetary gear 36 orbits clockwise while it turns on its own axis because the sun gear 35 is blocked by the blocking portion 203 from turning counterclockwise. Thus, the closing lever 38 follows orbiting of the planetary gear 36 and swings clockwise or in the closing direction around the pivot shaft 34 more slowly than the sector gear 39 to the closing position where the closing portion 381 faces up in FIG. 9.

In FIG. 7, when the blocking lever 20 and planetary gear mechanism 33 are in the blocking and neutral positions, the sector gear 39 turns counterclockwise or in the releasing direction around the pivot shaft 34 with reverse rotation of the motor 321. The closing lever 38 is forced counterclockwise by the spring 40 and held in the neutral position. The planetary gear 36 pivotally mounted to the closing lever 38 turns on its own axis without orbiting. Thus, the sun gear 35 turns at a certain angle clockwise or in the releasing direction based on the rotation of the planetary gear 36 on its own axis, and the contact portion 352 comes in contact with the releasing portion 301a of the first release-output lever 301 forward to allow the first release-output lever 301 to actuate in the releasing direction.

The releasing action of the first release-output lever 301 is transmitted to the floating pin 308, second release-output lever 302, motion-transmitting member 503 and handle-connecting lever 102 of the motion-connecting section 100. Furthermore, the releasing action of the handle-connecting lever 102 is transmitted to the ratchet 9 via the output lever 103, motion-transmitting member 505, release input lever 19 and opening lever 12 when the locking/unlocking mechanism 101 of the motion-connecting section 100 is in the unlocking state. Thus, the ratchet 9 is released from the latch 7 to enable the door D to open. After the releasing action of the latch mechanism is completed, the motor 321 is reversed to allow the planetary gear mechanism 33 to return to the neutral state.

As mentioned above, in the planetary gear mechanism 33 according to this embodiment, the external teeth 391 and internal teeth 392 are formed on the sector gear 39, and the single planetary gear 36 is disposed in the opening 395 of the sector gear 39. Hence the single planetary gear 36 orbits and turns on its own axis in the opening 395 inside the circumference thereby enabling the planetary gear mechanism 33 to become smaller in the circumferential direction.

Furthermore, in the sector gear 39, the external teeth 391 and internal teeth 392 are formed on the outer and inner circumferences of the sector corresponding to less than 180 degrees as central angle, and in the sun gear 35, the external teeth 351 is formed on the outer circumference of the sector corresponding to less than 180 degrees as central angle, thereby enabling the sector gear 39 and sun gear 35 to become smaller and enabling the planetary gear mechanism 33 to become smalle56r.

Then, the motion of the door closer device 1 will be described with respect to FIGS. 7-14.

Closing Action

In FIG. 7, when the door D is open, or when the latch unit 2 is in the opening state and all elements of the closer-release unit 3 are in the neutral position, the door D is closed to the incompletely-shut position, and the striker S engages with the latch 7 in FIG. 8, so that the latch 7 turns to the half-latch position and the ratchet 9 engages with the half-latch engagement portion 72 of the latch 7. The actuated portion 111 of the latch lever 11 comes into the moving path of the closing portion 381 of the closing lever 38 with the rotation of the latch 7 to the half-latch position.

When it is detected by the half-latch detecting switch 14 that the latch 7 turns to the half-latch position, the motor 321 is controlled as normal rotation by the control circuits. Thus, in the half-latch state in FIG. 8, the output gear 322 turns counterclockwise in a direction by the arrow and the sector gear 39 swings in a closing direction shown by an arrow. In this case, the blocking lever 20 is in the blocking position and the blocking portion 203 is in a position where it can come in contact with the contact portion 352 of the sun gear 35. Hence, the sun gear 35 swings counterclockwise slightly, and the contact portion 352 comes in contact with the blocking portion 203 thereby blocking counterclockwise swinging. So the planetary gear 36 orbits while it is held in the opening 395 of the sector gear 39.

With clockwise orbiting of the planetary gear 36, the closing lever 38 swings clockwise or in the closing direction by the arrow against the force of the spring 40, and the closing portion 381 moves upward to push up the actuated portion 111 of the latch lever 11 and to make the latch lever 11 to swing counterclockwise. Thus, in FIG. 9, the latch 7 swings from the half-latch position to the full-latch position, And when the full-latch position of the latch 7 is detected by the full-latch detecting switch 15, the motor 321 is stopped once by the control circuits and then reversed immediately.

When the motor 321 is reversely controlled, the sector gear 39 is reversed counterclockwise and the planetary gear 36 orbits while it turns on its own axis counterclockwise. The closing lever 38 is reversed by a counterclockwise force to return to the neutral position in FIG. 10. And when the detecting switch 62 detects the neutral position of the sector gear 39, the motor 321 is stopped and the planetary gear mechanism 33 returns to the neutral state before actuation, so that a series of closing actions ends.

Canceling the Closing Action

In the step on the way for moving from the half-latch state in FIG. 8 to the full-latch state in FIG. 9, for example, in case that something is held between the door D and the entrance of the vehicle body to stop the closing action, the outside handle OH or inside handle IH is operated to open the door D to prevent something from being held.

When the locking/unlocking mechanism 101 of the motion-connecting section is in the unlocking state, the motor 321 is stopped by door-opening action of the outside handle OH or inside handle IH. At the same time, in FIG. 11, the release-input lever 19 is actuated in the releasing direction, and the releasing portion 192 presses down the second arm 122 of the opening lever 12, and the ratchet 9 is moved with the opening lever 12 in the releasing direction. The bent portion 193 comes in contact with the contact portion 201 of the blocking lever 20 and swings the blocking lever 20 against the spring 23 to the canceling position.

When the blocking lever 20 moves to the canceling position, the blocking portion 203 goes out of the moving path of the contact portion 352 of the sun gear 35 to make the sun gear 35 to turn counterclockwise. So, reduced transmission from the sector gear 39 to the planetary gear 36 is disconnected and the closing lever 38 is reversed by the neutral position by the spring 40 to enable the latch 7 to swing to the open position. Hence, the door D can be opened immediately. By avoiding danger that something is held between the door D and entrance of the vehicle body, security is enhanced.

After something is not held, opening action of the outside handle OH or inside handle IH is stopped, and the motor 321 is reversed. The sector gear 39 swings to the ring-gear neutral position. With its own rotation and orbiting of the planetary gear 36 by swinging the sector gear 39, the sun gear 35 returns to the sun-gear neutral position in FIGS. 7 and 8. Thus, a series of canceling actions end.

When the locking/unlocking mechanism 101 of the motion-connecting section 100 is in the locking state, door-opening action of the outside handle OH or inside handle IH is not transmitted to the release-input lever 19, but is transmitted to the emergency lever 21. So the releasing action of the emergency lever 21 swings the blocking lever 20 to the canceling position thereby enabling the closing action to stop.

Releasing Action

Figure 13:
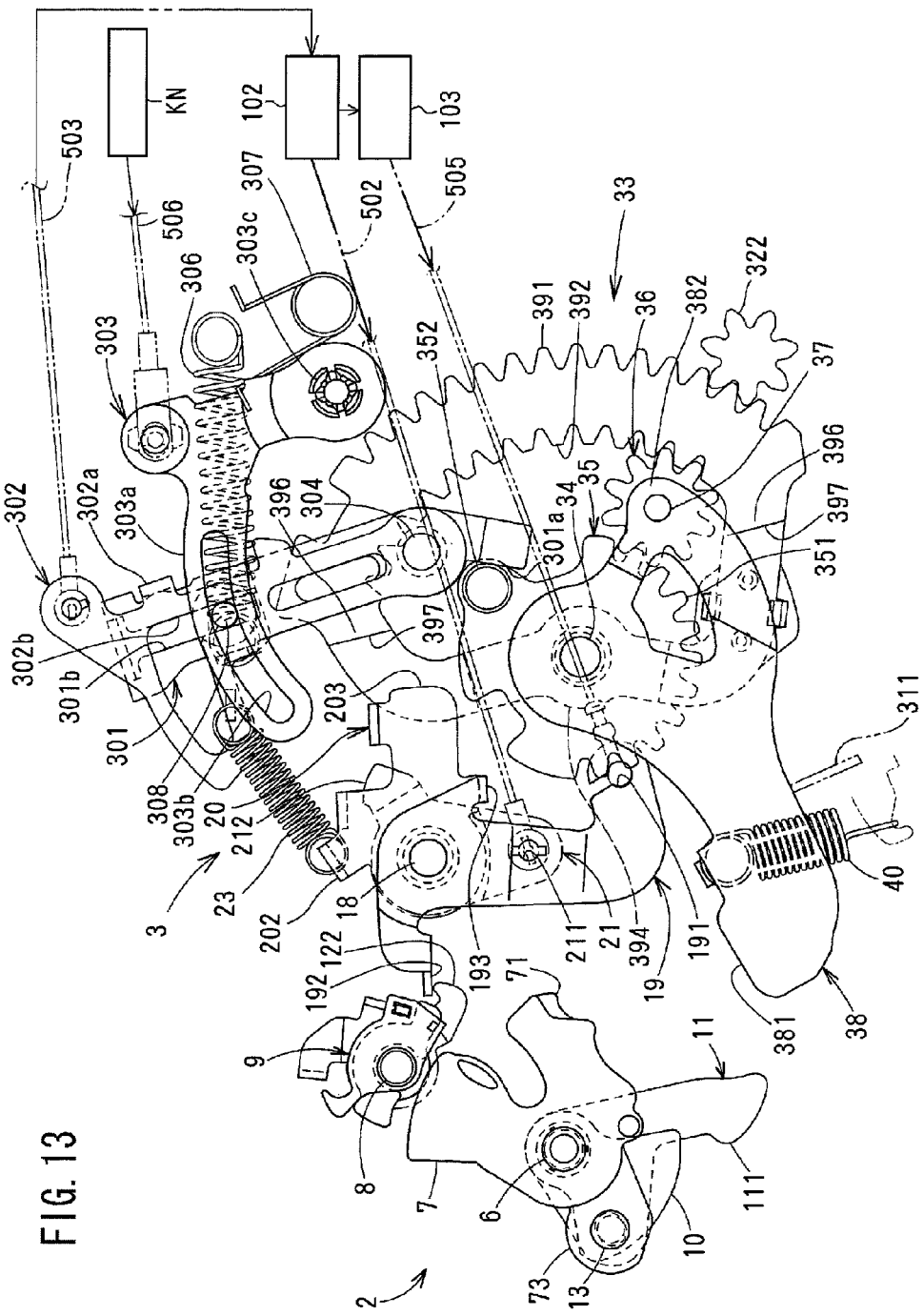
FIG. 13 is a front view of the door closer device in a releasing state.
Figure 14:
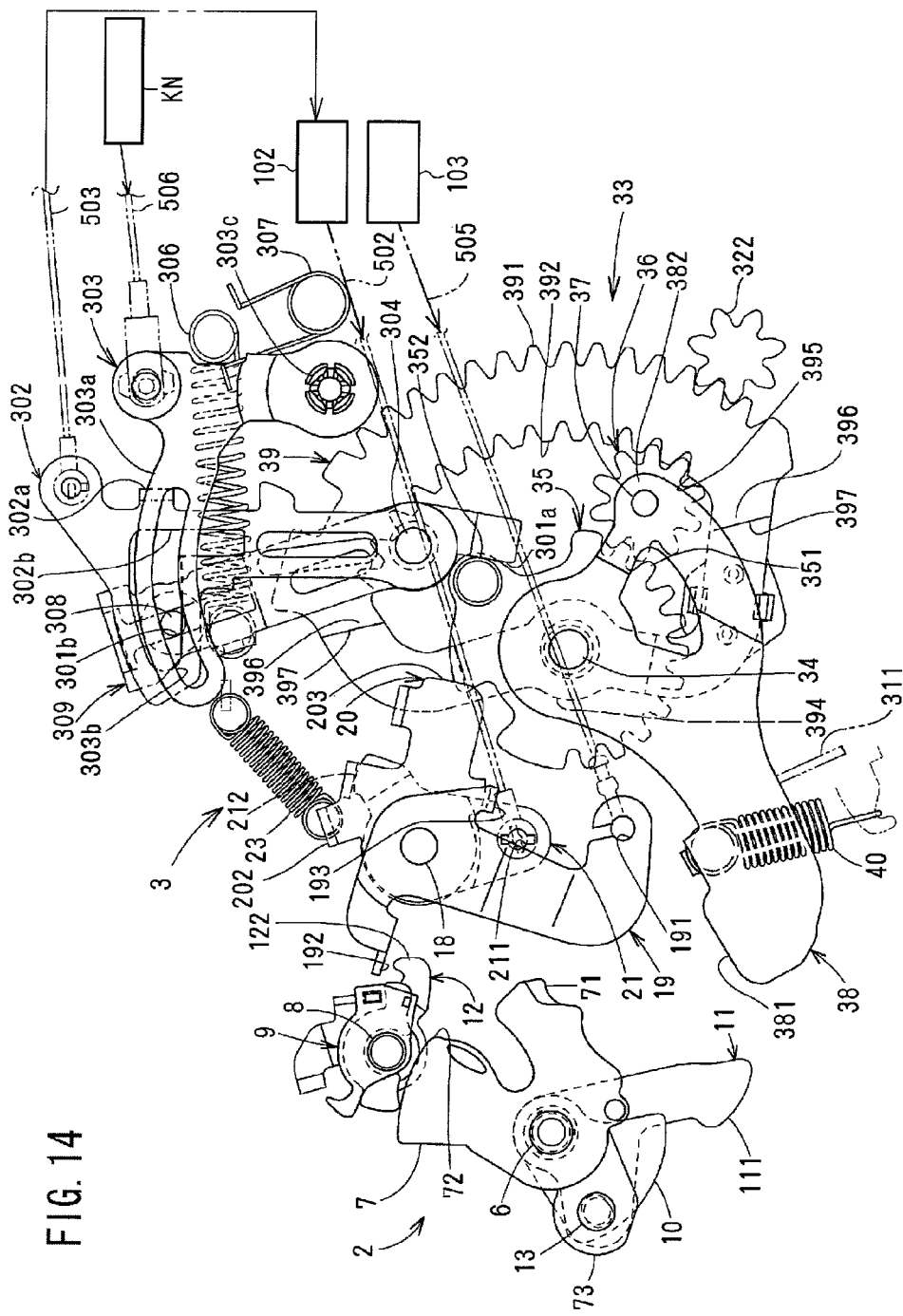
FIG. 14 is a front view of the door closer device when releasing action is canceled.

In FIG. 7, by operating a switch or a wireless switch in the vehicle, the motor 321 reverses. Thus, the sector gear 39 turns around the pivot shaft 34 counterclockwise or in a releasing direction, However, the planetary gear 36 is held in the neutral position and is pivotally coupled to the closing lever 38 which does not turn counterclockwise. Hence, the planetary gear 36 rotates on its own axis without orbiting. The sun gear 35 turns at a certain angle in the releasing direction from the sun-gear neutral position by turning the planetary gear on its own axis. In FIG. 13, with rotation of the sun gear 35, the contact portion 352 of the sun gear 35 comes in contact with the releasing portion 301a of the first release-output lever 301, actuating the first release lever 301 in the releasing direction.

When the canceling lever 303 is in the connecting position, releasing action of the first release-output lever 301 is transmitted to the second release-output lever 302 via the floating pin 308, and releasing action of the second release-output lever 302 is transmitted to the handle-connecting lever 102 of the motion-connecting section 100 via the motion-transmitting member 101. The releasing action given to the handle-connecting lever 102 is transmitted to the release input lever 19 via the output lever 103 and the motion-transmitting member 505 when the locking/unlocking mechanism 101 of the motion-connecting section 100 is in the unlocking state. Thus, the ratchet 9 disengages from the latch 7 to enable the door D to open.

Canceling the Releasing Action

When the sector gear 39 is actuated in the releasing direction from the neutral position, owing to electric trouble or other cause, the sector gear 39 stops in a position where the sector gear 39 is actuated in the releasing direction to disable it to return to the ring gear neutral position. In FIG. 13, the contact portion 353 of the sun gear 35 is still in contact with the releasing portion 301a, and it occurs that the first release-output lever 301 and second release-output lever 302 are held in the released position. In this state, even if the door D is closed, the ratchet 9 is held in the released state and cannot engage with the latch 7, so that the door D cannot be closed.

In the foregoing release-holding state, the locking knob KN is operated to lock or unlock the door D and the release-holding state is released, so that the door D can be closed immediately.

In the release-holding state in FIG. 13, the locking knob KN is operated to lock or unlock the door D. The action is transmitted to the canceling lever 303 via the motion-transmitting member 506, and the canceling lever 303 acts to the disconnected position against the spring 307. Thus, the floating pin 308 follows the movement of the canceling lever 303 to the disconnected position, so that the motion-transmitting path between the first release-output lever 301 and the second release-output lever 302 is disconnected to enable the second release-output lever 302 to move to the neutral position. Thus, the second release-output lever 302 held in the released position can be returned to the neutral position while the first release-output lever 301 is left, opening lever 12 to return to the neutral position and enabling the release input lever 19 and opening lever 12 to return to the neutral position, so that the ratchet 9 engages with the latch 7 enabling the door D to close.

The embodiment of the present invention will be described, and various changes and modifications may be made as below without departing from the scope of claims.

(a) The closing portion 381 of the closing lever 38 may directly be coupled to the latch 7 without the latch lever 11.

(b) The base member 31 of the closer-release unit 3 may be fixed to the housing 5 directly or via another element without fixing the base member 31 to the cover plate 4 of the latch unit 2.

(c) In order to keep the sun gear 35 from turning in the other direction counterclockwise in FIG. 4, a stopper of the base member 31 may be used instead of the blocking lever 20.

(d) The second release-output lever 302 may be coupled directly or indirectly to the ratchet 9 without the motion-connecting section 100.

(e) The first and second release-output levers 301,302 may be omitted. With one rotation in a single direction of the sun gear 35 or clockwise in FIG. 4, the contact portion 352 can contact the ratchet 9, opening lever 12 or release input lever 19 to allow the ratchet 9 to be released.

(f) The canceling lever 303 may be connected directly or indirectly to an operating member which can be operated when the door D opens or to a member which moves together with opening/closing of the door D instead of the locking knob KN.

What is claimed is:

1. A vehicle door closer device comprising:
   a latch unit comprising a latch that is capable of moving from a half-latch position to a full-latch position and a ratchet that is capable of engaging with the latch in the half-latch position or full-latch position;
   a motor; and
   a closer-release unit comprising a planetary gear mechanism, the planetary gear mechanism comprising
   a pivot shaft,
   a sun gear pivoted via the pivot shaft, the sun gear being capable of turning in a first direction from a sun-gear neutral position and incapable of turning in a second direction opposite the first direction from the sun-gear neutral position,
   a planetary gear which meshes with the sun gear and revolves around the sun gear while the planetary gear rotates on its own axis,
   a closing lever pivoted via the pivot shaft and pivoting the planetary gear and
   a ring gear pivoted via the pivot shaft and having internal teeth meshing with the planetary gear in an inner circumference of the ring gear, the ring gear being capable of turning in a closing direction equal to the first direction of the sun gear and in a releasing direction opposite the closing direction,
   the planetary gear revolving around the sun gear while the planetary gear rotates on its own axis when the ring gear turns in the closing direction, the closing lever turning in the closing direction by the orbiting of the planetary gear to turn the latch from the half-latch position to the full-latch position,
   the planetary gear turning on its own axis when the ring gear turns in the releasing direction, the sun gear turning in one direction by turning the planetary gear on its own axis to release the ratchet from the latch.

2. The vehicle door closer device of claim 1, further comprising an output gear rotating by the motor, the ring gear further comprising on its outer circumference external teeth which mesh with the output gear.

3. The vehicle door closer device of claim 1 wherein the ring gear comprises a sector gear.

4. The vehicle door closer device of claim 1 wherein the closer-release unit further comprises a release-output lever which is directly or indirectly connected to the ratchet to move in the releasing direction for releasing the ratchet from the latch,
   the sun gear comprising a contact portion which can contact the release-output lever so that the release-output lever rotate in the releasing direction by turning the sun gear in one direction from the sun-gear neutral position.

5. The door closer device of claim 1 wherein the closing lever is forced in a direction opposite the closing direction by a spring so that the closing lever is held in a closing-lever holding position, the closing lever being connected to the latch directly or indirectly.

6. The vehicle door closer device of claim 1 wherein the device is used in a sliding door.

7. A vehicle door closer device comprising:
   a latch that is capable of engaging with a striker;
   a ratchet that is capable of engaging with the latch;
   a motor;
   a reduction mechanism which steps down rotation speed of the motor, the motion by the motor being transmitted to the ratchet via the reduction mechanism and a motion-transmitting path to move the ratchet from an engagement position where the ratchet engages with the latch to a released position where the ratchet disengages from the latch, the reduction mechanism having a rotary member; and
   a release-canceling mechanism disconnecting the motion-transmitting path to enable the ratchet to return to the engagement position, the release-canceling mechanism comprising a first release-output lever configured to come in contact with the rotary member of the reduction mechanism to move the ratchet to the released position, a second release output lever connected to the ratchet directly or indirectly and a cancelling lever operable from a connected position connecting the motion-transmitting path and a disconnected position disconnecting the motion-transmitting path, wherein the second release-output lever can transmit the motion that comes from the reduction mechanism via the first release lever to the ratchet to move the ratchet to the released position when the canceling lever is in the connected position, and wherein the canceling lever disconnects the motion-transmitting path between the first release-output lever and the second release-output lever when the canceling lever is in the disconnected position.

8. The vehicle door closer device of claim 7 wherein the reduction mechanism comprises a planet gear mechanism.

9. The vehicle door closer device of claim 7 wherein the rotary member comprises a sun gear of the planetary gear mechanism.

10. The vehicle door closer device of claim 7 wherein the device is used in a sliding door.

* * * * *